United States Patent [19]

Garcia Lopez

[11] Patent Number: 5,373,812
[45] Date of Patent: Dec. 20, 1994

[54] APPARATUS FOR EXTERMINATING ANIMAL PARASITES IN SITUS

[76] Inventor: Francisco J. Garcia Lopez, Acoyte 454 1 Piso "B", Buenos Aires 1405, Argentina

[21] Appl. No.: 94,707
[22] Filed: Jul. 22, 1993
[51] Int. Cl.⁵ ............................................. A01K 29/00
[52] U.S. Cl. .................................................. 119/159
[58] Field of Search .............. 119/156, 157, 159, 160; 43/125; 600/21, 22

[56] References Cited

U.S. PATENT DOCUMENTS

| | | | |
|---|---|---|---|
| 1,714,635 | 5/1929 | Schafer | 119/160 |
| 3,108,568 | 10/1963 | Whitney et al. | 119/160 |
| 3,148,649 | 9/1964 | Moore et al. | 119/159 |
| 3,492,987 | 2/1970 | Parker | 600/21 |
| 3,505,989 | 4/1970 | Truhan | 600/21 |
| 4,224,936 | 9/1980 | Cox | 600/21 |

Primary Examiner—Gene Mancene
Assistant Examiner—Thomas Price
Attorney, Agent, or Firm—William H. Maxwell

[57] ABSTRACT

An and apparatus for the extermination of parasites including fleas and ticks characterized by hermetically enclosing the body of a host animal within a chamber and circulating an atoxic vapor through the chamber as a treatment repeated until the parasite count is reduced, and an apparatus comprised of a hermetic chamber with air recirculation of a vaporized liquid lethal to the parasites.

5 Claims, 2 Drawing Sheets

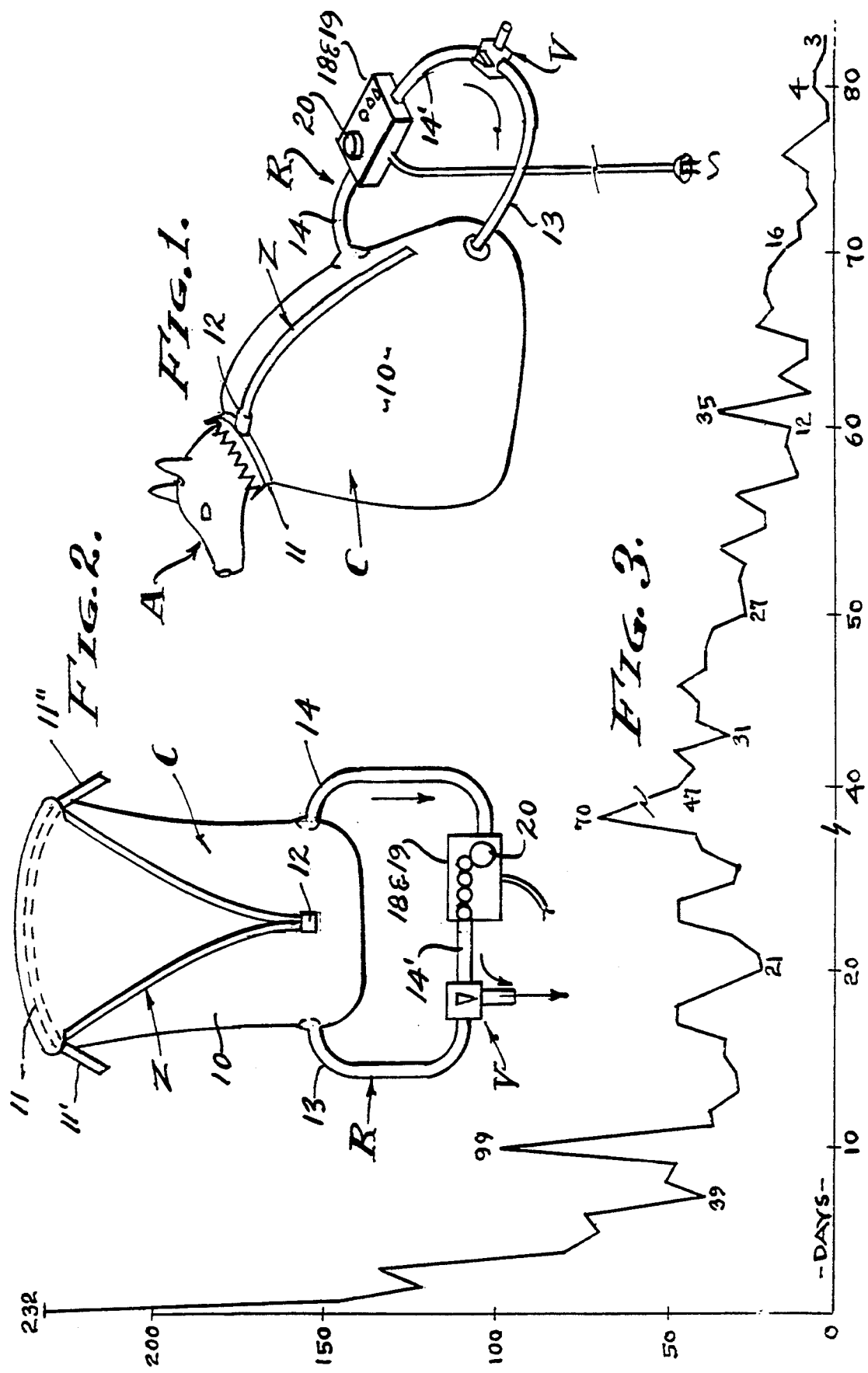

APPARATUS FOR EXTERMINATING ANIMAL PARASITES IN SITUS

BACKGROUND OF THE INVENTION

Heretofore, the known processes for the extermination of animal parasites such as fleas (CTENOCEPHALIDES CANNIS O FELIS) or ticks (DERMACENTOR VARIBILIS, IXODES) are based upon the use of toxic chemical agents applied directly to the skin or epidermis of the host animal. This is customarily done by soap bath, spraying or powdering with toxic antiparasitic substances of varied compositions and strengths. That is, toxic chemicals are used in bathing (dilluted in water) or sprayed or dusted in powder form, all of which does not permit frequent application and with the likelihood of animal intoxication by assmimilation through licking and swallowing and by absorbtion through the skin. And, the problem is critical with young or old and weakened animals. In the practice of prior art extermination methods, the parasite will leave the host animal only to return when the antiparasitic effect has decreased so as to be ineffective. Accordingly, it is an object of this invention to provide a method and apparatus that ensures extermination and riddance of the parasites from the host animal, and all without adverse effects.

The prior art parasite eradication methods that involve bathing in antiparasitic solutions require drying after bathing, it being an object of this invention to eliminate bathing and to avoid the necessity of drying. With the present invention a parasiticide is applied in vapor form, a substantially dry vapor.

The method of parasite extermination as it is disclosed herein involves the environment of the host animal involved, and all of which is implemented by the particular apparatus disclosed. The involved environment includes the habitat of the host animal, for example the dwelling and surrounding grounds where a pet animal is kept. It is the life cycle of the parasite that is of concern, it being an object of this invention to break its reproduction cycle which is characteristically PARASITE-LARVA-PUPA-PARASITE. It is known that parasites such as fleas and ticks inhabit the grounds, the vegetation and the furnishings of the pet animal habitat, it being an object of this invention to systematically interrupt the parasite life cycle when hosted by the animal upon which it feeds and dwells during copulation. To this end, this method involves progressive extermination that interrupts the life cycle of the parasite while it is dwelling on the host animal. With this invention, there is a direct attack on the parasite where it spends long periods of time feeding on the host animal. This feeding period is also the copulation period. Therefore, it is an object of this invention to provide a method that progressively exterminates parasites on the host animal during the feeding period of the parasite life cycle. It is also an object to provide a dry process by subjecting the host animal to dry atoxic vapors that effectively kill the parasite in situs.

The vapor method of parasite extermination herein disclosed is performed without fumigating the habitat of the host animal, and the atoxic vapor employed is, preferably a saturated vapor of trichloroethylene ($C_2HCl_3$) in a closed circuit. Therefore, it is an object to provide an apparatus that performs this process, subjecting the host animal's body to said vapor while permitting the animal from breathing the atoxic vapor. In practicing this invention, there is a vaporizing means and a vapor pump means in a closed circuit through a bag that is closed around the body of the animal to form a hermetic chamber. The subjection time period is a factor to be regulated in treatment of the animal. Accordingly, it is an object to provide a timer means by which subjection to the atoxic vapor is controlled. In practice, the saturation capability of the atoxic vapor is regulated by the aforesaid vaporizing means. It is also an object to provide relief means to exhaust the used vapors when the time period of application is over.

A feature of this invention is the use of a vapor that is atoxic for the host pet and for the human keeper but deadly for the parasite, and which can be applied more frequently than conventional highly toxic chemicals. In practice, the atoxic vapor of the present invention is applied daily for the progressive parasitic extermination in numbers of parasites that exceeds their reproductive capacity, by interrupting their normal life cycle. In other words, the practice of this method and use of this apparatus enforces a systematic and continued reduction in the parasite colony whereby a definitive exterminaton thereof is reached. Effectiveness of this method and apparatus is detected by simple observation and number count of the fleas or ticks that drop off of the host animal at the conclusion of each treatment. In practice, a treatment is applied to the host animal each day. For example, a fifteen minute treatment is given to a severely infected large animal, and a lesser treatment for lesser infestations and to smaller animals, all as circumstances require. It is normal to continue treatments over a three month period of time, as is documented by the graph record of FIG. 3 of the drawings.

SUMMARY OF THE INVENTION

The purpose of this invention is to systematically exterminate parasites, fees and ticks, from host animals or pets and their habitat. The body of the host animal is enveloped within a hermetic chamber, but with its head protruding through a collar so as to breath the surrounding atmosphere. A closed air recirculating ducting and air pump continuously recirculates air through said chamber. And, vaporizing device charges the recirculated air with an atoxic agent tolerable to the host animal and its human keeper, but deadly to the parasite. The preferred atoxic agent is Trichloroethylene. This atoxic agent is introduced into the recirculating system as a liquid and vaporized by means of heat and evaporation. Treatment of the animal body is by immersion in a substantially dry atoxic vapor that is deadly to the parasite and applied as frequently as required on a timed basis to exceed the reproductive capacity of the parasite colony that feeds off the host animal and occupies the animal's habitat or home environment. Accordingly, the extermination of the parasite colony is definitive and ensured as determined by the reduction in the number of dead parasites counted after each treatment.

The foregoing and various other objects and features of this invention will be apparent and fully understood from the following detailed description of the typical preferred form and application thereof, throughout which description reference is made to the accompanying drawings.

THE DRAWINGS

FIG. 1 is a perspective view of an apparatus employed in carrying out the method of this invention.

FIG. 2 is a plan view of the apparatus shown in FIG. 1, with the chamber thereof open and the pet animal removed.

FIG. 3 is a graph illustrating a severe history of parasite extermination by this parasite extermination in number per day, for 83 days.

Figure 6:
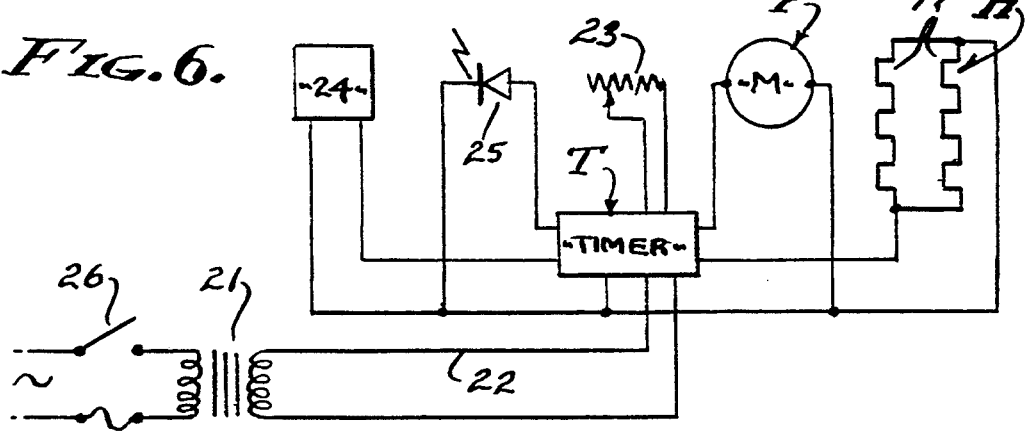

And, FIG. 6 is an electrical diagram showing the arrangement of parts and elements schematically.

PREFERRED EMBODIMENT

Referring now to the drawings, this method of parasite extermination is carried out with the apparatus disclosed or the equivalent, which repeatedly performs treatment of the host animal suffering from an infestation of fleas and/or ticks. The method involves the following steps. The first step is to enclose the body of the host animal within a hermetic chamber with its head exposed to the surrounding atmosphere. The second step is to recirculate air (vapor) through the chamber. The third step is to charge the recirculating air with an atoxic vapor lethal to parasites hosting on said animal. The fourth step is that of exhausting the recirculated air and entrained atoxic vapor to atmosphere. And, the fifth step is the removal of the host animal from the chamber for return to its normal habitat. The treatments are conducted periodically on a continuing basis until the parasite colony is exterminated through the interruption of the parasite's reproductive cycle.

The first step of enclosing the body of the host animal in a chamber is by means of enveloping the animal's body within a hermetic closure with a collar for exposure of the animal's head to the outside atmosphere for normal breathing.

The second step of recirculating air through the chamber is by means of closed circuit ducting and air pumping that continuously fills the chamber with air, and as disclosed to inflate the chamber.

The third step of charging the recirculating air with atoxic vapor is by means of vaporizing a parasiticide agent from a liquid state to a gaseous state, and preferably liquid Trichloroethylene ($C_2HCl_3$), through the application of heat applied to said liquid above ambient temperature for its evaporation and vaporization into the recirculating air pumped through the chamber occupied by the animal's body isolated from its head.

The fourth step of exhausting air and recirculating entrained atoxic vapor to atmosphere is signaled or automated by timer means to operate valve means that opens the closed circuit to the atmosphere. The purpose of this exhaust step is to deflate the chamber and dissipate the atoxic vapors in order to avoid subjection thereto by the animal and/or its human keeper.

The fifth step of removing the host animal from the chamber is simply the reverse of the aforementioned first step. The exterminated parasites drop off of the host animal and are counted.

The graph of FIG. 3 is a record of a reduction to practice conducted between Oct. 19, 1992 and Jan. 9, 1993, a period of 83 days or 83 treatments. The parasite or flea count after the first treatment was 232. The flee count dropped to 39 after the seventh treatment. On Nov. 12, 1992 the count rose to 70, but thereafter decreased progressively to just three fleas after the Jan. 9, 1993 treatment. It is to be observed that the flea colony became non-prolific, there being a conspicuous and definitive absence of mature fleas. In practice, treatments are continued four or five days after apparent extermination of the colony of parasite fleas.

Referring now to the preferred apparatus embodiment of the present invention, there is a chamber means C for occupancy by the body of the host animal A. This chamber means is preferably an envelope or bag of heavy imperforate wall 10 of flexible plastic material that is supple so as to be inflated and deflated over the body of the host animal A. The wall 10 has an opening collar 11 separated by the mating members of an elongated zipper means Z for hermetically closing the chamber when joined as shown in FIG. 1, where the slide 12 of the zipper also couples the otherwise open collar 11. The head of the host animal A protrudes through the collar 11 for normal breathing.

Recirculating means R is provided for continuously supplying air to and withdrawing air from the hermetically closed chamber. This means R is preferably a pair of flexible air hoses 13 and 14 for induction and exhaust of air into and from the chamber.

Air pump means P is provided for continuously pumping air for recirculation through the aforementioned chamber, preferably a turbo type fan F driven by a motor M and inserted into the closed air recirculation circuit between hoses 13 and 14. Accordingly, air recirculates through the chamber means C when the air pump means P is operated, to fill and/or inflate said chamber.

Figure 4:
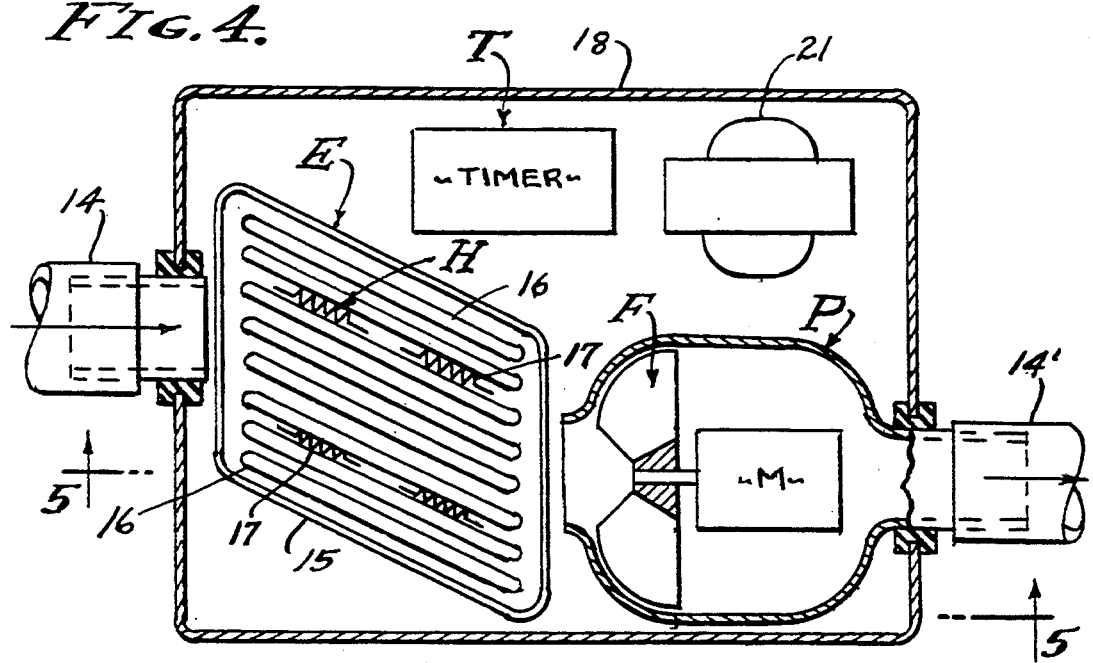
FIG. 4 is a plan sectional view of the vapor generator and pump unit which houses the controls for conducting the atoxic method disclosed herein.
Figure 5:
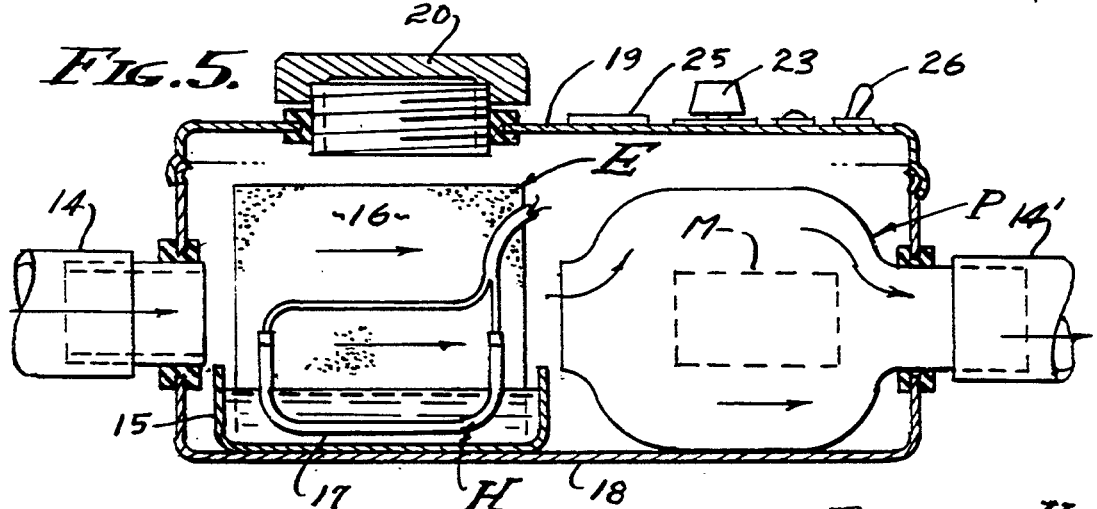
FIG. 5 is a longitudinal sectional view taken substantially as indicated by line 5—5 on FIG. 4.

A vaporizing means E is provided to entrain a vapor in the air recirculated by the air pump means P, preferably an atoxic parasiticide agent evaported from its liquid state and into a vapor. The resulting vapor is essentially dry as it is derived from full strength Trychloroethylene. In practice, this atoxic agent is a liquid ($C_2HCl_3$) carried in a tray 15 where it is picked up by wicking and preferably by a plurality of spaced parallel porous ceramic capillary baffles 16 over which recirculated air flows from hose 13 through the air pump means P through hose 14 and its extension 14'. Heating means H is provided to enhance the evaporation process by raising the liquid temperature above ambient. In practice, one or more CalRods® 17 are immersed in the liquid carried in the tray 15 as best illustrated in FIG. 5.

A feature of this invention is the hermetic isolation of the atoxic vapor entrained in the recirculated air, and this includes the enclosure of the atoxic vapor recirculated through a housing 18 that encloses the air pump means P and the tray 15 with its vertically and longitudinally disposed baffles 16. Access to the means P and E, and to the ancillary means as shown, is by means of a removable air tight cover 19 that has a filler cap 20 for filling the tray 15 with the atoxic liquid to be evaporated.

Valve means V is provided for either recirculating air through the chamber or exhausting air therefrom. Recirculation is free flowing from the downstream pressurized discharge of the air pump means P so as to fill the treatment chamber and, as shown, to inflate it with atoxic vapor atmosphere during the treatment period. Alternately, the valve means V stops flow through induction hose 13 and exhausts the used vapor laden air to atmosphere. In practice, the valve means V is a three-way valve having a free flow position as indicated in FIG. 1 that directs recirculation from hose extension 14' and through hose 13. Alternately and as shown in FIG.

2 the valve means V closes hose 13 and opens hose extension 14' from pump means P to atmosphere.

Referring now to FIG. 6 of the drawings, there is a transformer 21 for reducing voltage to a supply bus 22 and to a timer means T. The timer means is infinitely adjustable by means of a variable resistor 23, for example from a ten minute to a twenty minute operational period, whereupon a buzzer 24 sounds. An LED 25 illuminates when the unit is operative and the timer means is ativated by an ON-OFF switch 26. The heater means H is energized for a shorted time interval, for example for a period of six minutes. And, the motor M of the air pump means P is shut off at the end of the adjusted timer period.

As shown in FIG. 2 the collar is in the form of a strap secured to the wall 10 add extended at 11' and 11" into hook and loop fastener means. For example, the hook element 11' faces inwardly while the loop element 11" faces outwardly, employing VELCRO ® as manufactured by Velcro U.S.A. Inc. of New York, N.Y.; or Scotchmate ® as manufactured by 3M Company of St. Paul, Minn. In FIG. 1 the extensions 11' and 11" are overlapped and pressed together for securement.

From the foregoing it will be understood how this method and apparatus for conducting parasite extermination is not only effective to rid the host animal of parasites such as fleas and ticks, but also to rid the environment or habitat of the parasite colonies that would infest other host animals and humans as well.

Having described only the typical preferred forms and application of my invention, I do not wish to be limited or restricted to the specific details herein set forth, but wish to reserve to myself any modifications or variations that may appear to those skilled in the art, as set forth within the limits of the following claims.

I claim:

1. An apparatus for ridding a host animal and its habitat of parasite infestation through the extermination of parasites on the host animal, and including;
   a hermetic chamber means for removably enclosing the body of the host animal,
   an air recirculating means for inducing air into and exhausting it from the hermetic chamber means,
   an air pump means for recirculating said recirculating air through the recirculating means,
   and vaporizing means comprised of a tray for the reception of a liquid state atoxic parasiticide, and capillary baffles immersed therein and exposed to the recirculating air for evaporation of said parasiticide and for charging the recirculating air with an atoxic vapor lethal to the parasites on the host animal,
   whereby said parasites are exterminated and fall from the host animal.

2. The apparatus for ridding a host animal and its habitat of parasite infestations as set forth in claim 1, wherein heater means is immersed in the liquid state parasiticide for raising it above ambient temperature.

3. The apparatus for ridding a host animal and its habitat of parasite infestations as set forth in claim 1, wherein valve means at the discharge of the air pump means selects recirculation of the recirculating air or its discharge to atmosphere from the air pump means.

4. The apparatus for ridding a host animal and its habitat of parasite infestations as set forth in claim 1, wherein timer means controls the period of air pump means and heater means operation.

5. The apparatus for ridding a host animal and its habitat of parasites infestations as set forth in claim 1, wherein heater means is immersed in the liquid state parasiticide for raising it above ambient temperature, wherein valve means at the discharge of the air pump means selects recirculation of the recirculation air or its discharge to atmosphere from the air pump means, and wherein timer means controls the period of air pump means and heater means operation.

* * * * *